(12) United States Patent
Hancock

(10) Patent No.: US 7,980,826 B2
(45) Date of Patent: Jul. 19, 2011

(54) STRENGTHENING STRUCTURE FOR A WIND TURBINE BLADE, A WIND TURBINE BLADE, A METHOD FOR ASSEMBLING A WIND TURBINE BLADE AND USE HEREOF

(75) Inventor: Mark Hancock, Southampton (GB)

(73) Assignee: Vestas Wind Systems A/S (DK)

( * ) Notice: Subject to any disclaimer, the term of this patent is extended or adjusted under 35 U.S.C. 154(b) by 7 days.

(21) Appl. No.: 12/549,149

(22) Filed: Aug. 27, 2009

(65) Prior Publication Data

US 2010/0003141 A1    Jan. 7, 2010

Related U.S. Application Data

(63) Continuation of application No. PCT/DK2008/000063, filed on Feb. 7, 2008.

(51) Int. Cl.
*F03D 1/06* (2006.01)
(52) U.S. Cl. ............... 416/223 R; 416/224; 416/226; 416/233; 29/889.71
(58) Field of Classification Search ............. 416/223 R, 416/224, 226, 233; 29/889.71
See application file for complete search history.

(56) References Cited

U.S. PATENT DOCUMENTS

| | | | | |
|---|---|---|---|---|
| 2,965,530 | A | * | 12/1960 | Stamm et al. ............ 416/213 R |
| 3,330,550 | A | * | 7/1967 | Brownlee .................. 416/223 R |
| 3,967,996 | A | * | 7/1976 | Kamov et al. ................. 416/226 |
| 4,305,699 | A | * | 12/1981 | Martinelli ..................... 416/226 |
| 4,643,646 | A | * | 2/1987 | Hahn et al. .................... 416/226 |
| 5,087,187 | A | | 2/1992 | Simkulak et al. |
| 5,332,178 | A | | 7/1994 | Williams |
| 5,417,549 | A | | 5/1995 | Purse et al. |
| 6,547,522 | B2 | * | 4/2003 | Turnquist et al. .......... 415/173.3 |
| 7,179,059 | B2 | * | 2/2007 | Sorensen et al. .............. 416/226 |
| 2004/0056152 | A1 | | 3/2004 | Yamashita et al. |
| 2006/0133937 | A1 | | 6/2006 | DeLeonardo et al. |

FOREIGN PATENT DOCUMENTS

| | | |
|---|---|---|
| DE | 4225599 A1 | 2/1994 |
| GB | 2293836 A | 4/1996 |
| WO | 2006089550 A2 | 8/2006 |

OTHER PUBLICATIONS

International Search Report; PCT/DK2008/000063; Aug. 12, 2008; 3 pages.
Danish Search Report; Danish Application No. PA 2007 00297; Oct. 12, 2007; 1 page.

* cited by examiner

*Primary Examiner* — Igor Kershteyn
(74) *Attorney, Agent, or Firm* — St. Onge Steward Johnston & Reens, LLC

(57) ABSTRACT

A strengthening structure for a wind turbine blade includes at least one first reinforcement part adapted to be connected to a first blade part of the wind turbine blade, and at least one second reinforcement part adapted to be connected to a second blade part of the wind turbine blade. The strengthening structure is characterized in that the at least one first reinforcement part and/or the at least one second reinforcement part includes an adjusting mechanism enabling that the first reinforcement part and the second reinforcement part are displaceable in relation to each other, at least during the assembly of the wind turbine blade and wherein the adjusting mechanism includes a force mechanism capable of forcing the first reinforcement part and the second reinforcement part away from each other. A wind turbine blade, a method for assembling a wind turbine blade and a use thereof are also contemplated.

18 Claims, 6 Drawing Sheets

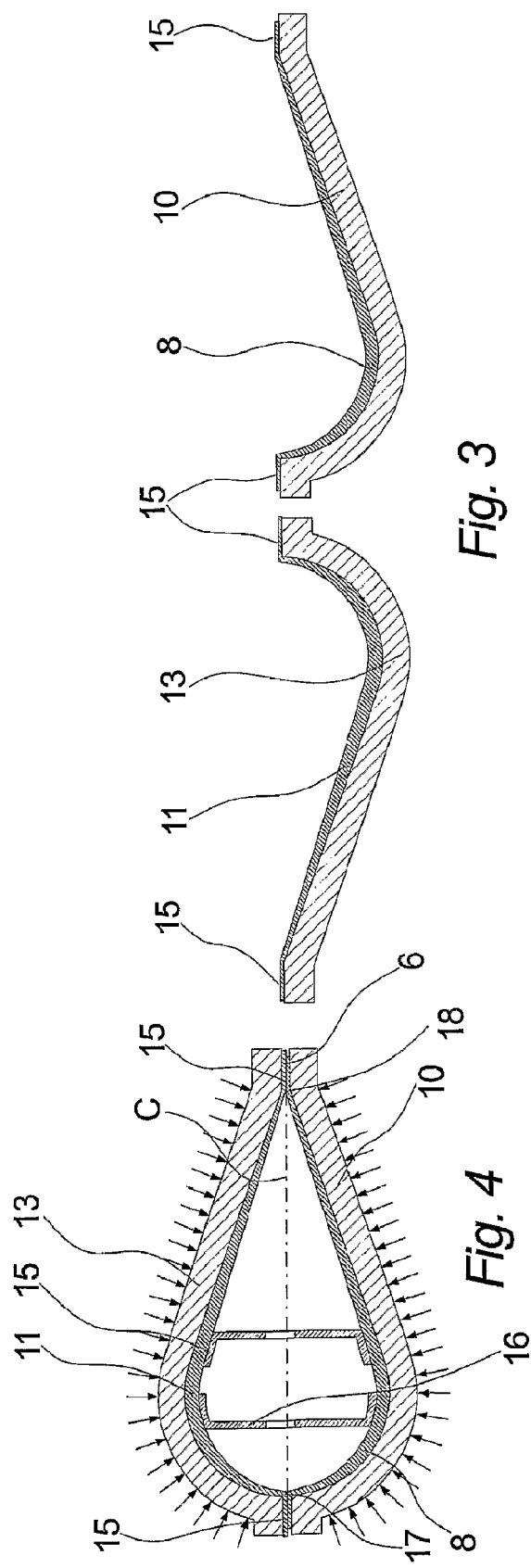

ed on Feb. 7, 2008 which designates the United States and claims priority from Danish patent application PA 2007 00297 filed on Feb. 27, 2007, the content of which is incorporated herein by reference.

STRENGTHENING STRUCTURE FOR A WIND TURBINE BLADE, A WIND TURBINE BLADE, A METHOD FOR ASSEMBLING A WIND TURBINE BLADE AND USE HEREOF

CROSS-REFERENCE TO RELATED APPLICATIONS

The present application is a continuation of pending International patent application PCT/DK2008/000063 filed on Feb. 7, 2008 which designates the United States and claims priority from Danish patent application PA 2007 00297 filed on Feb. 27, 2007, the content of which is incorporated herein by reference.

FIELD OF THE INVENTION

The invention relates to a strengthening structure for a wind turbine blade, at least one first reinforcement part adapted to be connected to a first blade part of said wind turbine blade, and at least one second reinforcement part adapted to be connected to a second blade part of said wind turbine blade, a wind turbine blade, a method for assembling a wind turbine blade and use hereof.

BACKGROUND OF THE INVENTION

A wind turbine known in the art comprises a wind turbine tower and a wind turbine nacelle positioned on top of the tower. A wind turbine rotor with a number of wind turbine blades is connected to the nacelle through a low speed shaft, as illustrated on FIG. 1.

The development of mass-produced wind turbines has always moved towards making them larger in output and thereby also in size. This process calls for better and more cost-efficient components and manufacturing methods, and particularly in the field of mass-produced wind turbine blades, this development has been profound, in that the average mass-produced wind turbine blade over the resent years has more than doublet its length.

Wind turbine blades known in the art are typically made of glass fibre and resin composite reinforced by metal, wood and/or carbon fibres. The blades are usually manufactured by moulding two blade halves in two independent moulds. When the blade halves are hardened the connecting surfaces are provided with an adhesive and a strengthening structure is provided inside one of the blade halves where after the halves are placed on top of each other.

An embodiment of such a blade and blade assembly procedure can be found in the international patent application WO 2006/089550.

A problem with this blade design and assembly method is that it can be very difficult to ensure correct positioning of the strengthening structure inside the blade.

An object of the invention is therefore to provide means and method for a more cost-efficient assembly of a wind turbine blade.

SUMMARY OF THE INVENTION

The invention provides for a strengthening structure for a wind turbine blade. The strengthening structure comprises at least one first reinforcement part adapted to be connected to a first blade part of the wind turbine blade, and at least one second reinforcement part adapted to be connected to a second blade part of the wind turbine blade where the at least one first reinforcement part and/or the at least one second reinforcement part comprises adjusting means enabling that the first reinforcement part and the second reinforcement part are displaceable in relation to each other, at least during the assembly of the wind turbine blade and wherein the adjusting means comprises force means arranged to force said first reinforcement part (9) and said second reinforcement part (12) away from each other at least during the assembly of said wind turbine blade (5).

Providing the blade with a strengthening structure comprising two reinforcement parts that are displaceable in relation to each other is advantageous in that it hereby—in a simple and inexpensive way—is possible to completely or partly compensate for any imprecision, inaccuracy or misalignments of the reinforcement parts, the blade parts or the assembly procedure and by providing force means attempting to force the reinforcement parts apart—at least during the assembly process—it is, in a simple and efficient way, possible to provide pressure to e.g. glued connections between the reinforcement parts and the blade parts during the assembly, to force the blade into a desired shape, to compensate for the forces of gravity during the assembly process or in other ways assists or aid the assembly process.

It should be emphasised that the term "strengthening structure" is to be understood as any kind of structure aside from the blade shells, that are provide in the blades to ensure the shape of the blade, to ensure the rigidity of the blade or in other way assists in maintaining the blades shape and/or function.

In an aspect of the invention, said adjusting means comprises guiding means for guiding a relative displacement between said first reinforcement part and said second reinforcement part.

By providing the adjusting means with guiding means it is possible to ensure that the parts only move in directions in which movement is desired, whereby a more efficient strengthening structure is provided.

In an aspect of the invention, said guiding means enables displacement in substantially only one direction.

By making the guiding means enable displacement in only one direction it is possible to more precisely control the assembly process.

It should be emphasised that the term "substantially only one direction" is to be understood that the guiding means provides the reinforcement parts with substantially only one degree of freedom i.e. the reinforcement parts may move back and forth in one direction.

In an aspect of the invention, said substantially only one direction is a direction substantially perpendicular with the chord of said blade.

Hereby is achieved an advantageous embodiment of the invention.

In an aspect of the invention, said force means is adapted for forcing said first reinforcement part and said second reinforcement part away from each other in a same direction as said substantially only one direction.

Hereby is achieved an advantageous embodiment of the invention.

In an aspect of the invention, said force means are one or more elastic members such as rubber pads, foam rubber pads, enclosed gas such as air or any kind of spring.

Hereby is provided simple and inexpensive resilient members.

In an aspect of the invention, said force means are one or more springs.

By using one or more springs e.g. a metal spring to provide a force between the reinforcement parts is advantageous in that it hereby is possible to control the load more precisely.

It should be emphasised that by the term "spring" is to be understood any kind of elastic body or device that recovers its original shape when released after being distorted.

In an aspect of the invention, said adjusting means comprises fixating means for fixating said first reinforcement part and said second reinforcement part in relation to each other.

Providing the strengthening structure with fixating means is advantageous in that it hereby is possibly to ensure the inflexibility and/or rigidity of the strengthening structure and thereby of the blade after the assembly process has ended e.g. during normal operation of the wind turbine blade.

In an aspect of the invention, said fixating means is an adhesive.

Hereby is achieved an advantageous embodiment of the invention.

In an aspect of the invention, said first reinforcement part is adapted to be connected to one or more surfaces by an inside of said first blade part and wherein said second reinforcement part is adapted to be connected to one or more surfaces by an inside of said second blade part.

Hereby is achieved an advantageous embodiment of the invention.

In an aspect of the invention, said strengthening structure comprises means for compensating for non-parallelism between said surfaces by the inside of said first blade part and said surfaces by the inside of said second blade part.

Because the blades are designed for optimal utilization of the wind, the surfaces can be very complex and it is therefore advantageous to provide the strengthening structure with means for compensating for non-parallelism.

In an aspect of the invention, said first reinforcement part and said second reinforcement part are adapted to be connected to said first blade part and said second blade part by means of an adhesive.

Hereby is achieved an advantageous embodiment of the invention.

The invention further provides for a wind turbine blade comprising a strengthening structure according to any of the preceding claims.

It can be very difficult to fit a strengthening structure known in the art in a wind turbine blade and it is therefore advantageous to provide a wind turbine blade with a strengthening structure according to the invention.

Even further the invention provides for a method for assembling a wind turbine blade. The method comprises the steps of
- establishing at least one first blade part and at least one second blade part in contact with, or in close proximity of each other to substantially form a wind turbine blade or a section of a wind turbine blade,
- establishing a strengthening structure inside said first blade part and said second blade part, said strengthening structure comprising at least one first reinforcement part and at least one second reinforcement part, and
- forcing said first reinforcement part and said second reinforcement part away from each other in order to press said first reinforcement part against said first blade part as well as to press said second reinforcement part against said second blade part.

Establishing an assembly force between the first reinforcement part and the second reinforcement part during the assembly of the blade is advantageous in that it hereby is possible to compensate for any inaccuracies or misalignments of the parts or the assembly process.

It should be emphasised that the strengthening structure in the present description of a method according to the invention is in no way limited to be placed inside the blade parts after they have been assembled. The strengthening structure or parts of the strengthening structure may just as well be placed on one or the other blade parts before the blade parts are assembled.

In an aspect of the invention, said method further comprises the step of fixating the position of said first blade part and said second blade part in relation to each other while said first reinforcement part (9) and said second reinforcement part (12) are pressed away from each other.

In an aspect of the invention, said first reinforcement part and said second reinforcement part are provided on said first blade part before said first blade part and said second blade part are brought in contact with each other.

In an aspect of the invention, the force between the first reinforcement part and the second reinforcement part is established by bringing said first blade part and said second blade part in contact with, or in close proximity of each other.

By making the process of bringing the two blade parts together the source of the assembly force is advantageous in that it hereby in a simple and inexpensive way is possible to establish the assembly force.

In an aspect of the invention, said assembly force is a counterforce to the force bringing and/or holding said first blade part and said second blade part in contact with, or in close proximity of each other.

By making the assembly force a counterforce to the assembling of the blade parts is advantageous in that the force is only established when needed.

Even further the invention provides for use of a method according to any of the previously mentioned methods for assembling a wind turbine blade according to any of the above, wherein said wind turbine blade is a blade for a variable speed pitch wind turbine.

Wind turbine blades for variable speed pitch controlled wind turbines are particularly long and slender and it is therefore especially advantageous to assemble a wind turbine blade for such a wind turbine type by means of a method according to the invention.

BRIEF DESCRIPTION OF THE DRAWINGS

The invention will be described in the following with reference to the figures in which FIG. 1. illustrates a large modern wind turbine as seen from the front, FIG. 3 illustrates a cross section of a first blade part and a second blade part placed beside each other, as seen from the root of the blade, FIG. 4 illustrates a cross section of a blade mould during the assembly of a wind turbine blade, as seen from the root of the blade.

DETAILED DESCRIPTION OF THE INVENTION

Figure 1:
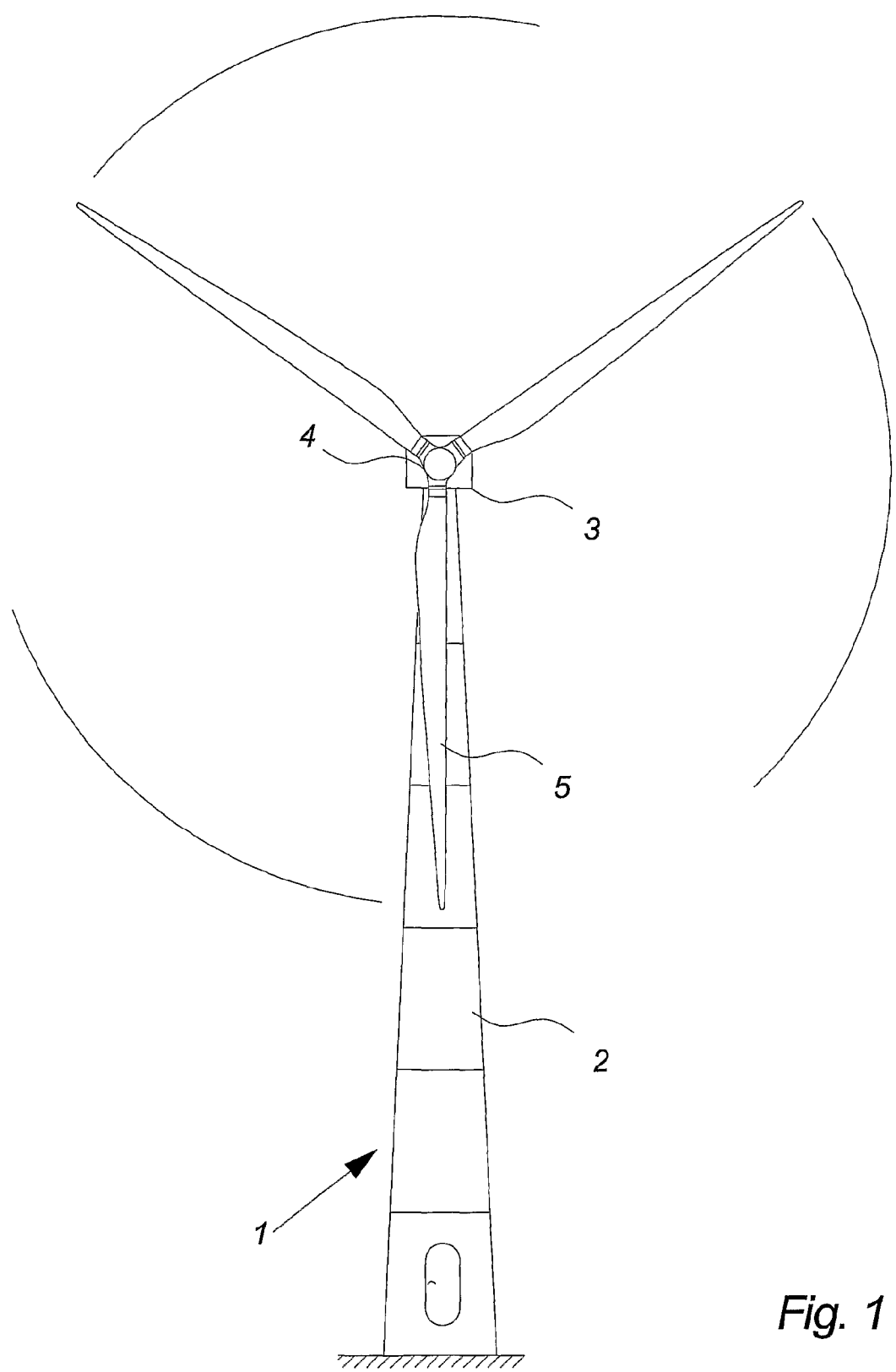

FIG. 1 illustrates a wind turbine 1, comprising a tower 2 and a wind turbine nacelle 3 positioned on top of the tower 2. The wind turbine rotor 4, comprising three wind turbine blades 5 mounted on a hub, is connected to the nacelle 3 through the low speed shaft which extends out of the nacelle 3 front.

Figure 2:
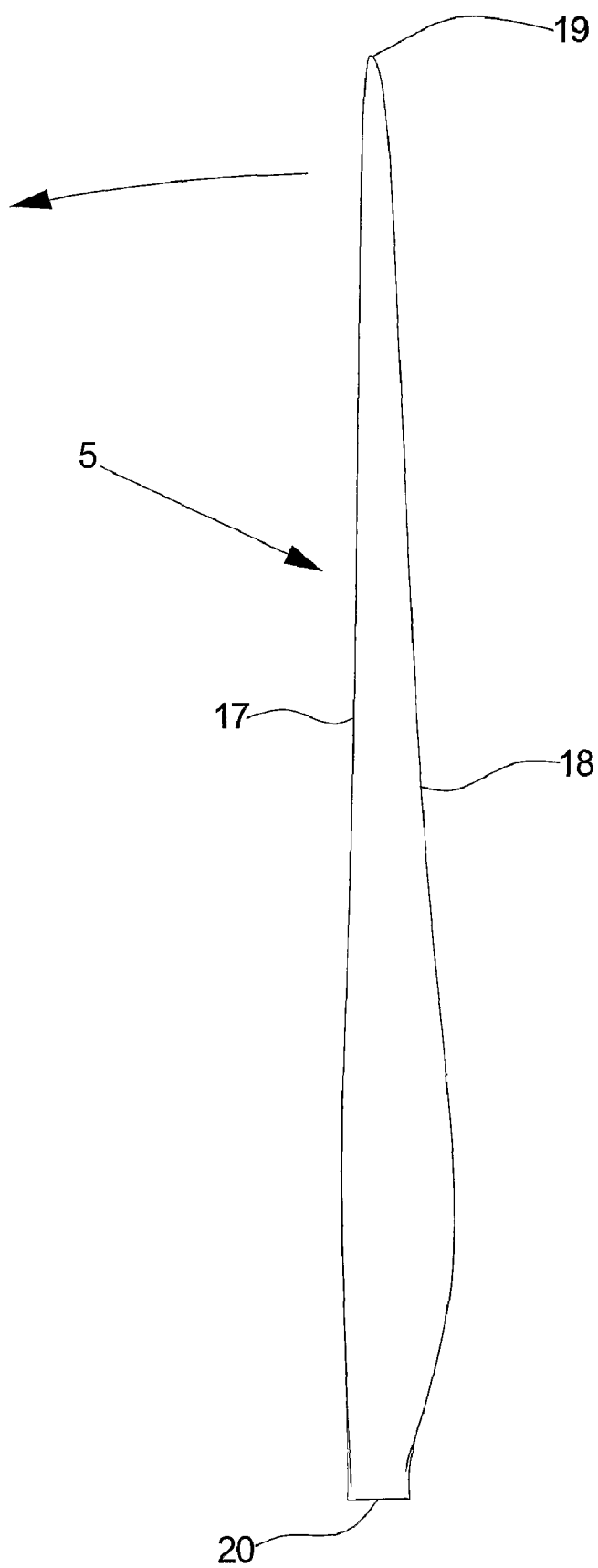
FIG. 2 illustrates a wind turbine blade, as seen from the front.

FIG. 2 illustrates a wind turbine blade 5, as seen from the front.

The wind turbine blade 5 comprises a leading edge 17, a trailing edge 18, a tip edge 19 and a root 20. The blade 5 is typically hollow, except for one or more strengthening structures 16 extending substantially the entire length of the blade 5 or part of the blades 5 length.

A wind turbine blade 5 known in the art is typically made of a glass fibre and resin composite reinforced by carbon fibre, carbon fibre reinforced wood or a combination hereof.

FIG. 3 illustrates a cross section of a first blade part 8 and a second blade part 11 placed beside each other, as seen from the root of the blade 5. The first blade part 8 is placed in a first fixating unit 10, which in this case is the mould in which the first blade part 8 is made. Likewise the second blade part 11 is placed in a second fixating unit 13, which also is the mould in which the second blade part 11 is moulded.

In this embodiment of the invention, the two substantially symmetrical fixating units 10, 13 and blade parts 8, 11 are placed beside each other with the outer surfaces of the blade parts 8, 11 facing down, during the moulding of the blade parts 8, 11.

When the blade parts 8, 11 has hardened, one or more of the contact surfaces 15 are provided with an adhesive, and the second fixating unit 13 including the second blade part 11 is rotated and positioned on top of the first fixating unit 10 including the first blade part 8, e.g. by means of some sort of a crane (like a gantry crane) or special-build rotating and positioning equipment.

The adhesive could also be provided to the contact surfaces after the blade parts 9, 12 are brought in contact with each other or in close proximity of each other.

In this embodiment the second blade part 11 is placed on top of the first blade part 8, but in another embodiment the first blade half 8 could be placed on top of the second blade half 11, or the two parts 8, 11 could be placed against each other in e.g. a vertical position.

In this embodiment the parts 8, 11 are formed as two entire halves of an entire wind turbine blade 5, but since wind turbines 1 are getting bigger and bigger, the wind turbine blades 5 are gradually getting to long to be transported in one piece. The blade 5 would then be manufactured as sections, which then are to be assembled at the wind turbine mounting site.

FIG. 4 illustrates the second blade part 11 placed on top of the first blade part 8 making the two parts 8, 11 abut at the contact surfaces 15. Before the second blade part 11 is placed on top of the first part 8, two strengthening structures 16 are attached to the inside surface of the first blade part 8 e.g. by means of adhesive. In this embodiment the strengthening structures 16 are form as formed as single structures extending from the inside surface of the second blade part 11 to the inside surface of the first blade part 8 as known in the art.

When the second blade part 11 is placed on top of the first 8, and the strengthening structures 16 are attached to the second blade part 12, the strengthening structures 16 constitutes cross braces making the blade 5 more rigid and helping the blade 5 maintain its shape.

After the assembly of the blade parts 8, 11 and strengthening structures 16, a pressure is applied e.g. by forcing the two fixating units 10, 13 against each other or by establishing vacuum inside the fixating units 10, 13 or inside the blade parts 8, 11 to ensure good and/or close contact between the different contact surfaces 15 while the adhesive hardens.

Figure 5:
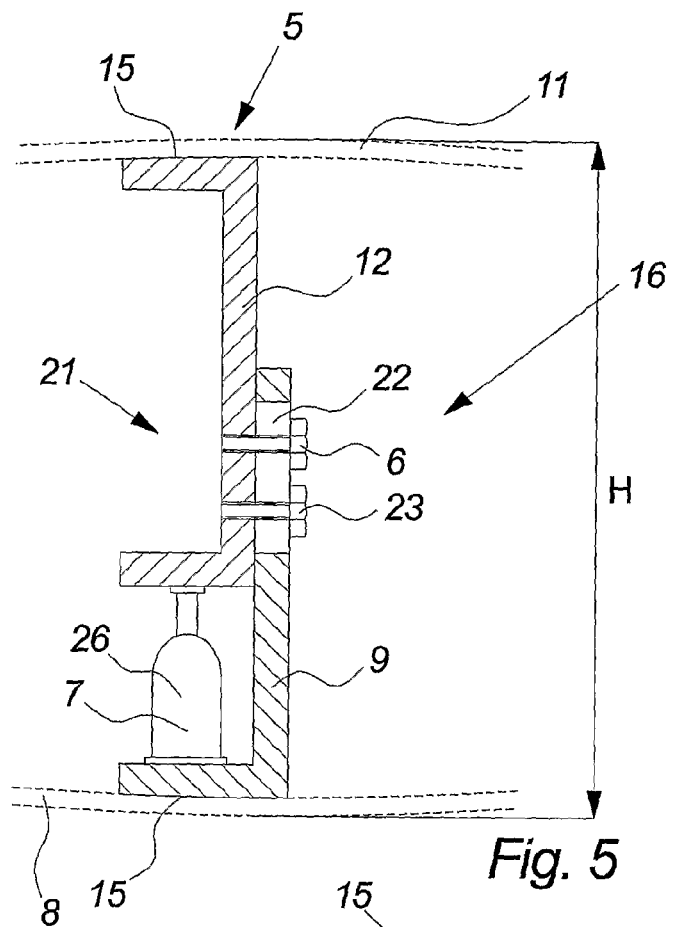
FIG. 5 illustrates a cross section of a first embodiment of a strengthening structure for a wind turbine blade, as seen from the root of the blade.

FIG. 5 illustrates a cross section of first embodiment of a strengthening structure 16 according to the invention for a wind turbine blade 5, as seen from the root 20 of the blade 5.

In this embodiment of the invention the strengthening structure 16 comprises a first reinforcement part 9 connected to a first blade part 8 and a second reinforcement part 12 connected to a second blade part 11. Substantially at the middle the reinforcement parts 9, 12 comprises adjusting means 21 comprising attachments means 6 which in this case are bolts placed in threaded holes in the second reinforcement part 12 and passing through guiding means 22 in the form of slots in the first reinforcement part 9.

The longitudinal direction of the slots 22 is substantially parallel with the cross section as shown in FIG. 5 hereby enabling, that if the bolts 6 are loosened the reinforcement parts 9, 12 can move relative to each other towards and from the blade parts 8, 11.

Because the slots 22 are relatively narrow—e.g. 0.2 mm wider than the diameter of the bolts 6—the relative displacement between the reinforcement parts 9, 12 is substantially limited to only one free motion direction i.e. the direction towards and from the blade parts 8, 11 which in this case is substantially perpendicular with the chord C of the blade 5.

In this embodiment of the invention the adjusting means 21 further comprises force means 7 which in this case is a number of hydraulic jacks 26 temporarily provided to force the reinforcement parts 9, 12 away from each other during the blade 5 assembly.

In this embodiment of the invention the assembly process could be that the entire strengthening structure 1 6 is attached to the first blade part 8 where after the second blade part 11 is placed on top of the first blade part 8 making the blade parts 8, 11 enclose the strengthening structure 16. Because of the complex design of the blade halves 8, 11 it is difficult to position the strengthening structure 16 accurately and the positioning tolerance chord wise is therefore relatively large.

In another embodiment of the invention the first reinforcement part 9 could be attached to the first blade part 8 and the second reinforcement part 12 could be attached to the second blade part 11 before the blade parts 8, 11 are brought together to be joined to form an entire wind turbine blade 5 or a section of a blade 5.

The bolts 6 of the adjusting means 21 of the strengthening structure 16 are then loosened and the jacks are activated to force the second reinforcement part 12 up against the second blade part 11. When the second reinforcement part 12 has reached its desired position or e.g. when the outside dimension of the blade 5 measured over the strengthening structure 16 is at a desired level i.e. the blade height H is correct, the jacks 26 are deactivated and the bolts are retightened to fixate the reinforcement parts 9, 12 and the blade parts 8, 11 in relation to each other.

In this embodiment of the invention the bolts 6 act as fixating means 25 of the adjusting means 21 of the strengthening structure 16 but in another embodiment the fixating means 25 could be lock pins, dedicated bolts or any other means suitable for permanently ensuring the relative position of the reinforcement parts 9, 12 after the assembly of the blade 5 is finished i.e. during normal operation of the blade 5.

In this embodiment of the invention the force means 7 are temporarily placed jacks 26 but in another embodiment the force means 7 could be permanently placed jacks, it could be wedges driven into place as a part of the adjustment, pneumatic cylinders, bags or balloons being blown up, spindles or bolts arranged to force the parts 9, 12 apart or it could be any other kinds of means part of, integrated in or separate from the adjusting means 21 enabling that the reinforcement parts 9, 12 is forced away from each other at least during the assembly of the blade 5.

In this embodiment of the invention the adjusting means 21 is provided to establish a desired height H of the blade 5 but in another embodiment the adjusting means 21 could be provided to compensate for inaccuracies in the positioning of the strengthening structure 16, to compensate for manufacturing inaccuracies in the strengthening structure 16 or the blade parts 8, 11 or to provide pressure to one or more of the joints between the reinforcement parts 9, 12 and the blade parts 8, 11 during the assembly of the blade 5 e.g. to ensure good contact between the parts 8, 9, 11, 12 while a adhesive in the joints hardens.

In this embodiment of the invention the reinforcement parts 9, 12 are adapted to the blade parts 8, 11 in that the contact surfaces 15 are formed to fit the inside surface of the blade 5 hereby enabling that the reinforcement parts 9, 12 may be attached to the blade parts 8, 11 by means of an adhesive such as any kind of natural or synthetic resin.

In another embodiment of the invention the reinforcement parts 9, 12 could be adapted to be connected to the blade parts 8, 11 by making the reinforcement parts 9, 12 and blade parts 8, 11 comprise corresponding holes for connection means, corresponding interlocking shapes or in other way corresponding shapes or the parts 8, 9, 11, 12 and/or the contact surfaces 15 between the parts 8, 9, 11, 12 could in another way be shaped, arranged or in another way adapted to be interconnected.

In this embodiment the blade is only provided with one strengthening structures 16 but in another embodiment the blade 5 could be provided with more than one strengthening structures 16 such as two, three, four or six juxtaposed structures 16, and all or some of the structures 16 could be placed inside the blade 5 after the two parts 8, 11 are placed on top of each other.

In another embodiment of the invention the blade 5 could also be provided with only one strengthening structures 16 e.g. in form of a beam. This beam could be the member carrying the entire blade 5, and the blade parts 9, 12 could then just be relatively thin shells, mainly provided for giving the blade its aerodynamic shape.

Figure 6:
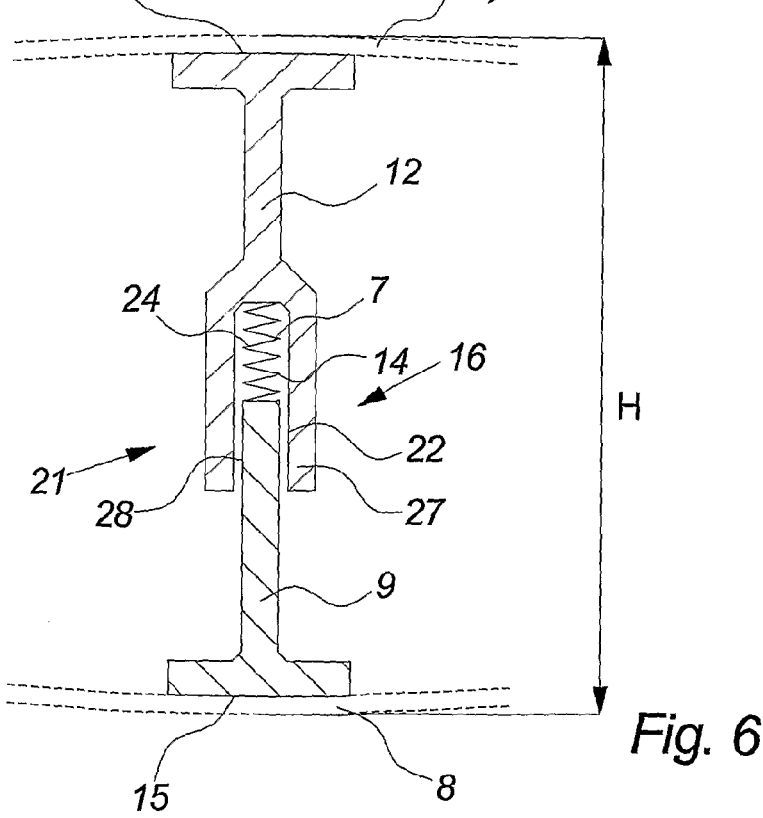
FIG. 6 illustrates a cross section of a second embodiment of a strengthening structure for a wind turbine blade, as seen from the root of the blade.

FIG. 6 illustrates a cross section of a second embodiment of a strengthening structure 16 according to the invention for a wind turbine blade 5, as seen from the root 20 of the blade 5.

In this embodiment of the invention the second reinforcement part 12 is fork-shaped enabling that the two legs 27 can act as guiding means 22 of the adjusting means 21 in that the first reinforcement part 9 can travel back and forth inside the slit 28 formed by the legs 27.

In this embodiment of the invention the adjusting means 21 is provide with force means 7 in the form of a resilient member 24 at the bottom of the slit 28 between the two legs 27.

The resilient member 24 is being pre-stressed when the two blade parts 8,11 is placed in contact with each other, in that the reinforcement parts 9, 12 hereby will be pressed against each other thus compressing the resilient member 24. The resilient member 24 will thereafter attempt to force the first reinforcement part 9 and the second reinforcement part 12 apart in that it will counterforce the load it is exposed to.

In this embodiment of the invention the resilient member 24 is a number of pressure springs 14 but in another embodiment the resilient member 24 could be another type of springs such as any kind of disc spring, torsions springs or tension spring or the member 24 could be one or more blocks or masses of flexible material such as rubber, foam rubber or any kind of gas filled cavity such as one or more air filled balloons or any other sort of elastic body or device that entirely or partly recovers its original shape when released after being distorted.

Figure 7:
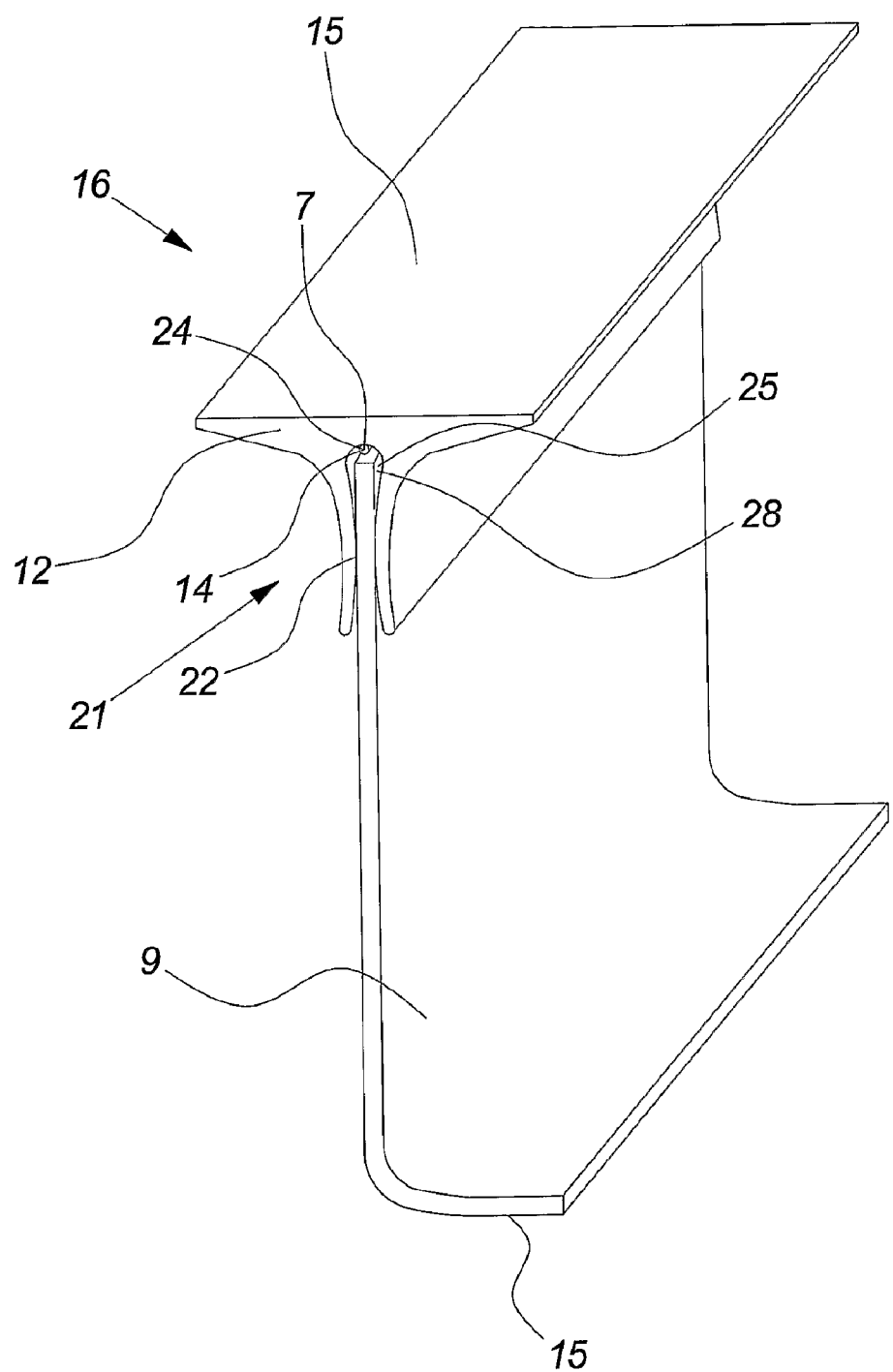
FIG. 7 illustrates a cross section of a third embodiment of a strengthening structure for a wind turbine blade, as seen in perspective.

FIG. 7 illustrates a cross section of a third embodiment of a strengthening structure 16 according to the invention for a wind turbine blade 5, as seen in perspective.

In this embodiment of the invention the reinforcement parts 9, 12 are adapted to be connected to the blade parts 8, 11 in that the reinforcement parts 9, 12 is provided with relatively wide contact surfaces 15 adapted to be provided with adhesive, hereby establishing a strong connection between the parts 8, 9, 11, 12.

Figure 8:
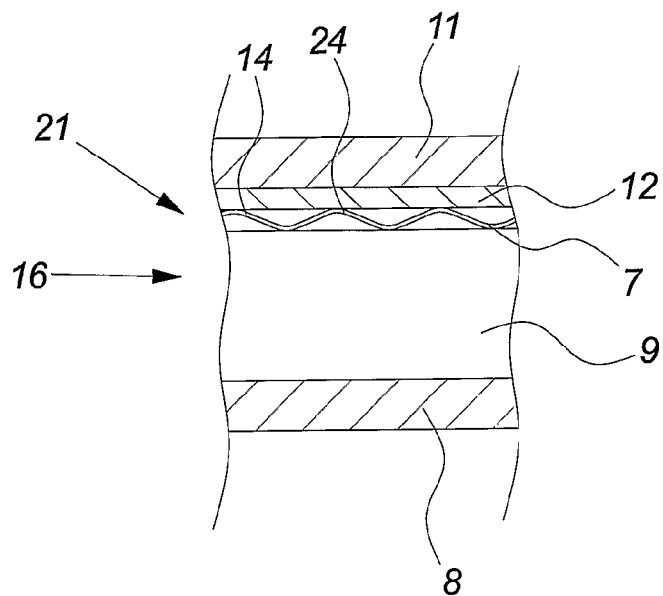
FIG. 8 illustrates a cross section of a blade comprising a strengthening structure including a spring, as seen from the trailing edge of the blade.

In this embodiment of the invention the adjusting means 21 is provide with force means 7 in the form of a specially adapted spring 14 which will be further discussed under FIG. 8.

The spring 14 will try to force the reinforcement parts 9, 12 away from each other to ensure pressure to the contact surfaces 15 during the hardening of the adhesive.

To substantially prevent the strengthening structure 16 from being flexible after the assembly, the adjusting means 21 is provide with fixating means 25 in the form of adhesive provided in the slit 28 in the second reinforcement part 12.

During or immediately before the assembly of the strengthening structure 16 or the blade 5 the slit is provided with an adhesive 25. During the blade 5 assembly e.g. when the adhesive connecting the reinforcement parts 9, 12 to the blade parts 8, 11 has substantially hardened, the force provided by the force means 7 is no longer needed or desired and adhesive provided in the slit 28 will gradually glue the reinforcement parts 9, 12 together making the reinforcement parts 9, 12 form one single substantially inflexible strengthening structure 16.

FIG. 8 illustrates a cross section of a blade 5 comprising a strengthening structure 16 including a spring 14, as seen from the trailing edge of the blade 5.

In this embodiment the adjusting means 21 is provide with force means 7 in the form of at least one spring 14 formed as a piece of wave shaped wire. Such a spring design is a simple and inexpensive way of forming a spring 14 that are particularly suited for being fitted in and operating in a slit 28.

In this embodiment the spring 14 is made of stainless steel that are particularly suited for making springs 14, but in another embodiment the spring 14 could be made of ordinary steel, of plastic or of another material comprising good resilient qualities.

Figure 9:
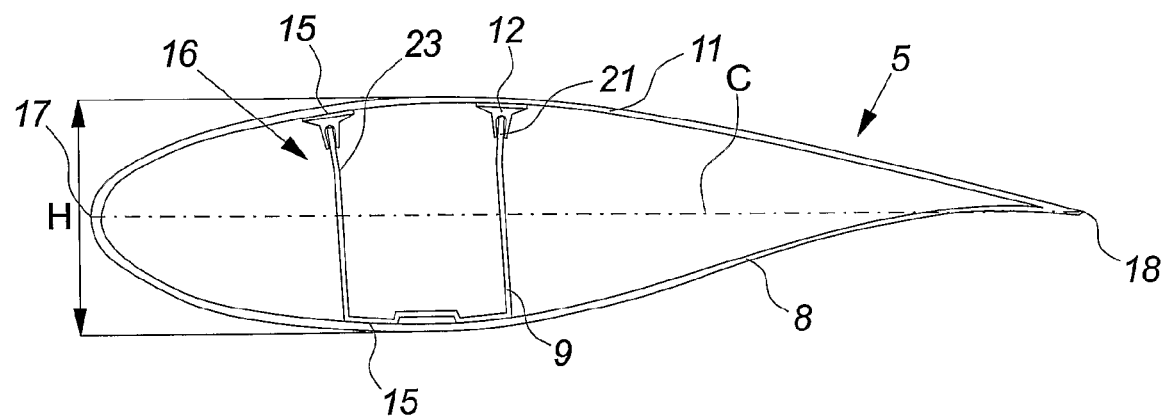
FIG. 9 illustrates a cross section of a blade comprising a U-shaped first reinforcement part, as seen from the root of the blade.

FIG. 9 illustrates a cross section of a blade 5 comprising a U-shaped first reinforcement part 9, as seen from the root of the blade 5.

In this embodiment of the invention the strengthening means 16 comprises one substantially U-shaped first reinforcement part 9 provided with one second reinforcement part 12 on top of each of the legs of the first reinforcement part 9.

The cross section of the blade 5 disclose a substantial tear-shape and because the blade 5 is designed regarding advantageous use of the wind both the inside and the outside surface of the blade 5 can be very complex and it will vary along the longitudinal length of the blade 5.

The first reinforcement part 9 is therefore in this embodiment of the invention provided with means for compensating for non-parallelism 23 between inside surface of the first blade part 8 and the inside surface of the second blade part 11.

In this embodiment of the invention these means for compensating for non-parallelism 23 is established in the form of permanent bends of in the legs of the U-shaped first reinforcement part 9 but in another embodiment the means could be comprised by the second reinforcement part 12, by another part of the strengthening means 16 or the means could be provided by a permanently or more likely temporarily flexible joint in one or more of the parts of the strengthening means 16.

The invention has been exemplified above with reference to specific examples of designs and embodiments of wind turbines blades 5, strengthening structures 16 and other. However, it should be understood that the invention is not limited to the particular examples described above but may be designed and altered in a multitude of varieties within the scope of the invention as specified in the claims.

What is claimed is:

1. A strengthening structure for a wind turbine blade comprising
    at least one first reinforcement part extending substantially perpendicular to a chord of said wind turbine blade and adapted to be connected to a first blade part of said wind turbine blade, and
    at least one second reinforcement part extending substantially perpendicular to a chord of said wind turbine blade and adapted to be connected to a second blade part of said wind turbine blade,
    wherein at least one of said at least one first reinforcement part and said at least one second reinforcement part comprises an adjuster enabling said first reinforcement part and said second reinforcement part to be displaceable in relation to each other at least during the assembly of said wind turbine blade, and
    wherein said adjuster comprises a forcer arranged to force said first reinforcement part and said second reinforcement part away from each other at least during the assembly of said wind turbine blade.

2. The strengthening structure according to claim 1, wherein said adjuster comprises a guide for guiding a relative displacement between said first reinforcement part and said second reinforcement part.

3. The strengthening structure according to claim 2, wherein said guide enables displacement in substantially only one direction.

4. The strengthening structure according to claim 3, wherein said substantially only one direction is a direction substantially perpendicular with the chord of said blade.

5. The strengthening structure according to claim 3, wherein said forcer is adapted for forcing said first reinforcement part and said second reinforcement part away from each other in a same direction as said substantially only one direction.

6. The strengthening structure according to claim 1, wherein said forcer comprises one or more elastic members.

7. The strengthening structure according to claim 1, wherein said forcer comprises one or more springs.

8. The strengthening structure according to claim 1, wherein said adjuster comprises a fixator for fixating said first reinforcement part and said second reinforcement part in relation to each other.

9. The strengthening structure according to claim 8, wherein said fixator comprises an adhesive.

10. The strengthening structure according to claim 1, wherein said first reinforcement part is adapted to be connected to one or more surfaces by an inside of said first blade part and wherein said second reinforcement part is adapted to be connected to one or more surfaces by an inside of said second blade part.

11. The strengthening structure according to claim 10, wherein said strengthening structure comprises means for compensating for non-parallelism between said surfaces by the inside of said first blade part and said surfaces by the inside of said second blade part.

12. The strengthening structure according to claim 1, wherein said first reinforcement part and said second reinforcement part are adapted to be connected to said first blade part and said second blade part by an adhesive.

13. A wind turbine blade comprising a strengthening structure according to claim 1.

14. A method for assembling a wind turbine blade, said method comprising the steps of
    establishing at least one first blade part and at least one second blade part in contact with, or in close proximity, of each other to substantially form a wind turbine blade or a section of a wind turbine blade,
    establishing a strengthening structure inside said first blade part and said second blade part, said strengthening structure comprising at least one first reinforcement part and at least one second reinforcement part extending substantially perpendicular to a chord of said wind turbine blade, and
    forcing said first reinforcement part and said second reinforcement part away from each other in order to press said first reinforcement part against said first blade part as well as to press said second reinforcement part against said second blade part.

15. The method according to claim 14, wherein said method further comprises the step of fixating a position of said first blade part and said second blade part in relation to each other while said first reinforcement part and said second reinforcement part are pressed away from each other.

16. The method according to claim 14, wherein said first reinforcement part and said second reinforcement part are provided on said first blade part before said first blade part and said second blade part are brought in contact with each other.

17. The method according to claim 14, wherein force between the first reinforcement part and the second reinforcement part is established by bringing said first blade part and said second blade part in contact with, or in close proximity, of each other.

18. Use of a method according to claim 14 for assembling a wind turbine blade, wherein said wind turbine blade is a blade for a variable speed pitch wind turbine.

\* \* \* \* \*